A. J. BARNHART.
CULTIVATOR.
APPLICATION FILED AUG. 25, 1913.
1,107,570.
Patented Aug. 18, 1914.
3 SHEETS—SHEET 1.
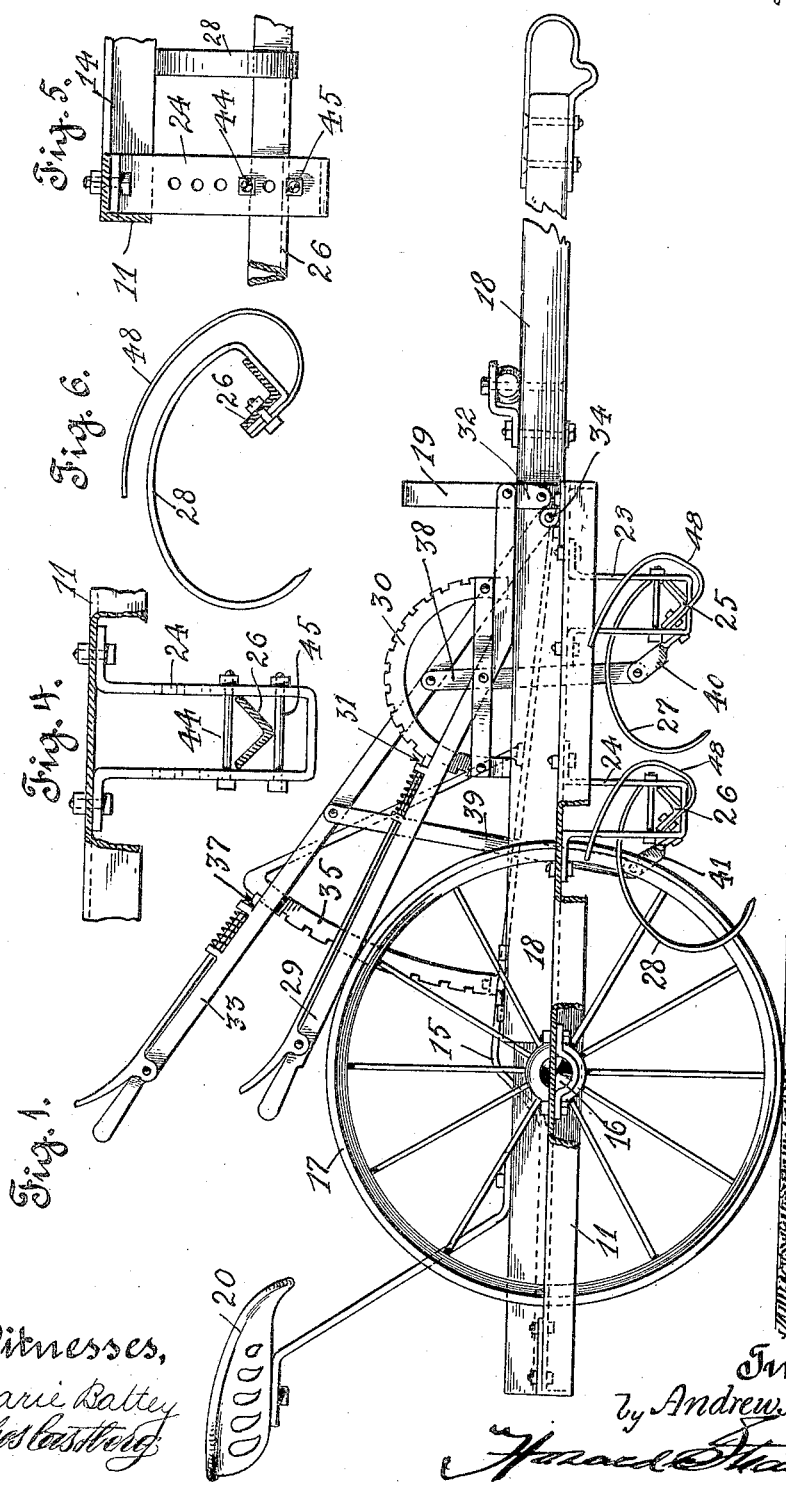

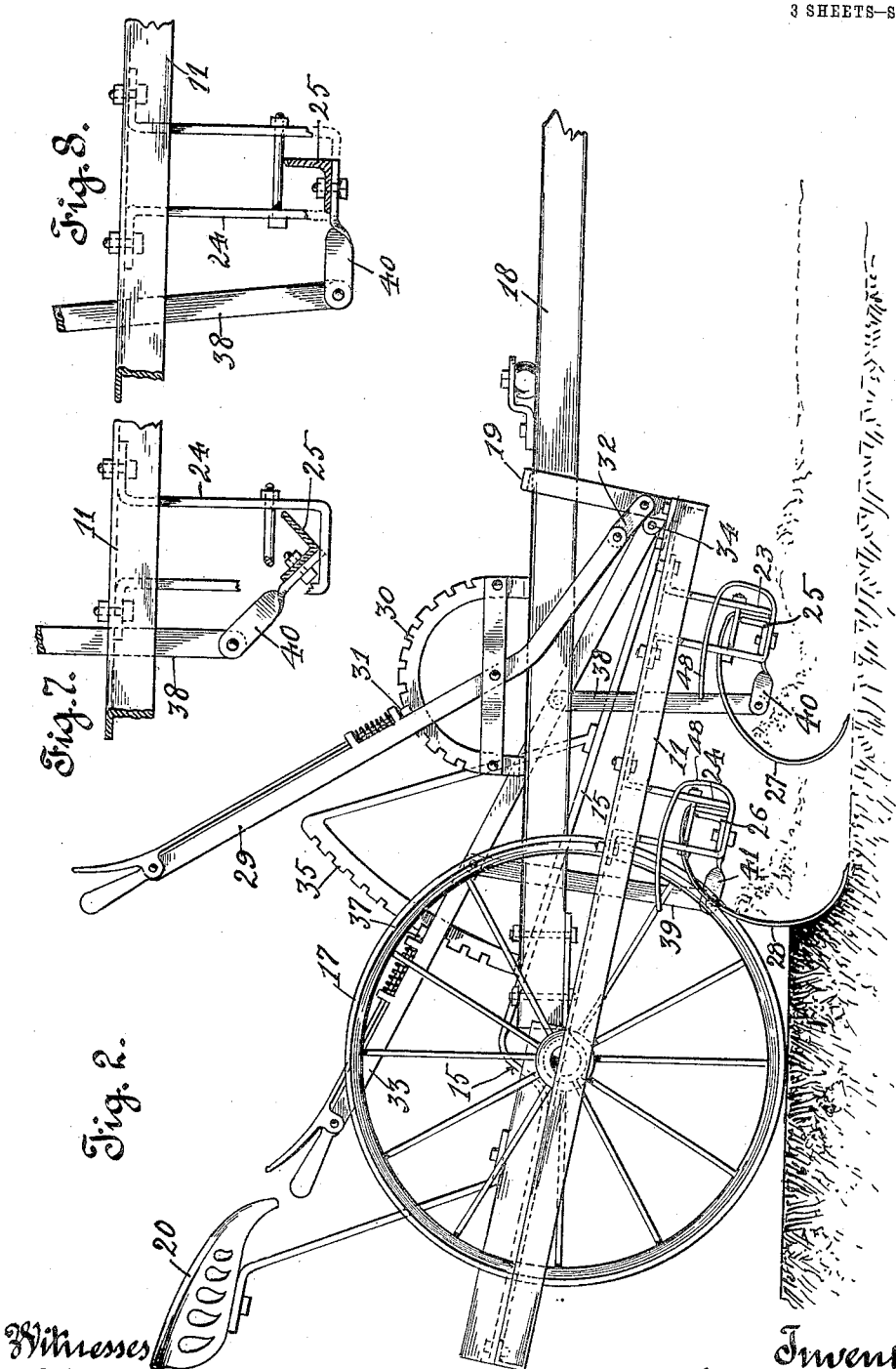

A. J. BARNHART.
CULTIVATOR.
APPLICATION FILED AUG. 25, 1913.

1,107,570.

Patented Aug. 18, 1914.

3 SHEETS—SHEET 3.

UNITED STATES PATENT OFFICE.

ANDREW J. BARNHART, OF AZUSA, CALIFORNIA.

CULTIVATOR.

1,107,570.

Specification of Letters Patent. Patented Aug. 18, 1914.

Application filed August 25, 1913. Serial No. 786,401.

*To all whom it may concern:*

Be it known that I, ANDREW J. BARNHART, a citizen of the United States, residing at Azusa, in the county of Los Angeles, State of California, have invented new and useful Improvements in Cultivators, of which the following is a specification.

This invention relates to cultivators, and particularly to wheeled cultivators, and the main object of the invention is to provide a cultivator which will cultivate under the limbs of trees which are trimmed close to the ground.

It is also an object to provide a wheeled cultivator with means for raising and lowering the cultivator teeth as desired.

It is a further object to provide means for supporting the cultivator teeth upon a transverse frame which can be freely moved to effect an angularity of contact of the cultivator blades.

It is a further object to provide a wheeled cultivator with means for providing a vertical adjustment of the transverse teeth bars that effect the angularity of the blades.

In the drawings accompanying this specification and forming therewith the application for Letters Patent: Figure 1 is a side elevation of the cultivator with the teeth and the movable frame in elevated position. Fig. 2 is a similar elevation showing the teeth lowered and in operative engagement with the soil upon which the machine is supported. Fig. 3 is a plan of the top of the machine, as shown in Fig. 1. Fig. 4 is a side detail of the supporting stirrups to carry the teeth bars, showing the bars in elevated position. Fig. 5 is a front elevation of the stirrup as shown in Fig. 4, with a portion of the tooth bar. Fig. 6 is a detail in side elevation of the cultivator tooth and the hood secured to the cross bar. Fig. 7 is a side elevation in detail of the mechanism for shifting the cultivator teeth in relation to the movable frame, showing the bar in the elevated position. Fig. 8 is a similar view showing the bar when the teeth are in their lowered position. Fig. 9 is a sectional detail of the frame, showing the supporting stirrup of the movable frame when the latter is elevated.

Heretofore in the cultivation of orchards, and especially citrus orchards where it is customary to trim the trees with the branches as close to the ground as possible, great difficulty has been encountered in properly cultivating the trees underneath the lower limbs, and this invention overcomes the above objection and provides a wheeled cultivator which will pass under the limbs without injuring the latter, or the fruit growing thereon.

More specifically in the drawings, the device consists mainly of a pivoted frame preferably formed of angle iron suitably braced, consisting of the front bar 10, side bars 11 and 12, together with the rear bar 14. A longitudinal bar 15 is also provided which is parallel with the side bars to form a substantially rectangular frame in which is mounted a shaft 16 having wheels 17 mounted thereon. These wheels are preferably of large diameter so that the frame is supported some distance above the ground, and secured to the shaft intermediate of the wheels is a tongue 18 which extends in parallel relation to the side bars 11 and 12 and over the front bar 10, a saddle yoke 19 being secured to the bar 10 in which the tongue 18 is slidably held.

A suitable seat 20 is secured either to the axle 16, the tongue 18 or the frame as desired, upon which the operator of the cultivator is seated, this seat being preferably placed to the rear of the axle when the latter is secured to the frame, as shown in Fig. 2 to assist in balancing the weight of the cultivating implements and the forward portion of the frame, the major portion being forward of the axle.

Depending from the side frames 11 and 12 are the stirrups 23 and 24 which are preferably bent to form rectangular supports within which are transversely mounted the cultivator bars 25 and 26, they being preferably formed of angle iron and of such length that they extend beyond the side bars of the pivoted frame a distance equal to that desired so that the cultivator shall extend under the trees, one side preferably being of greater length than the other. Secured to each one of these cross bars are a plurality of hook-shaped cultivator teeth 27 and 28 respectively, these teeth being preferably staggered and formed of such shape that when the frame is tilted or lowered by means of the operating lever 29 that the points will assume a parallel position in traveling through the soil as shown in Fig. 2.

To properly secure the lever 29 a rack 30 is secured to the tongue 18 upon which the lever is also pivoted, the lever being provided with a suitable locking latch 31 to lock the frame in the desired position, the downward movement being limited by the upper portion of the tongue loop 19. A link 32 is preferably interposed between the connection of the lever 29 of the pivoted frame so that there will be no binding action in the lowering. The cross bars 25 and 26 are turnable within the stirrups 23 and 24 and to rotate them to move the teeth in proper angular relation to the ground a lever 33 is provided which is pivoted on the pivoted frame at the point 34, an arc rack 35 being provided and secured to the bar 15 with which a latch 37 engages. Connected to the lever 33 are a plurality of links 38 and 39, the link 38 being connected to a short lever arm 40 secured to the cross bar 25, and the link 39 being connected to the lever arm 41 connected to the transverse bar 26. It will thus be seen that by lifting the lever 29 from the position shown in Fig. 1, the teeth are depressed below the surface of the ground, the angularity of the teeth being controlled by means of the lever 33.

To provide for adjustment of the cross bars the strap metal or irons forming the stirrups 23 and 24 are preferably provided with a plurality of apertures which register with one another and through which may be inserted bolts 44 and 45 to support the angle bars carrying the teeth. By this means the bars may be regulated to be lifted higher than the position shown in Fig. 1 in the stirrups.

The lever arms 40 and 41 are preferably secured to one face of the angle irons. To the opposite face the cultivator teeth 27 and 28 are secured respectively, and to provide means for protecting the branches hoods 48 are provided which are preferably secured to the same angle face as the arms 40 and 41, the hoods being formed in the looped cross sectional configuration shown in Fig. 6.

What I claim is:

1. In a cultivator having a frame and a wheeled support therefor, stirrups depending from said frame, transversely disposed cultivator tooth carrying bars, means for adjusting said bars in said stirrups in relation to the frame, and means to rock said bars in their varied adjusted positions in said stirrups to vary the angular relation of cultivator teeth thereon to the ground.

2. A cultivator, comprising a wheeled support, a tongue secured thereto, a frame pivotally mounted on said wheeled support, means to guide said frame in relation to said tongue, means to raise and lower said frame, transversely disposed cultivator teeth bars, cultivator teeth mounted on said bars and extending beyond the sides of said frame, means to adjustably support said bars in relation to said pivoted frame, means to rock said bars in said supports, and hoods adapted to be secured to said cultivator bars to protect the limbs of trees under which it is desired to pass said hooded bars.

3. A cultivator, comprising a wheeled support, an axle therefor, a tongue pivotally secured to said axle, a floating frame pivotally mounted on said axle, a yoke adapted to embrace said tongue secured to said floating frame, means secured to said tongue to raise and lower said frame, a plurality of dependent stirrups secured to said frame adjacent said tongue, transversely disposed bars tiltingly mounted in said stirrups, cultivator teeth secured to said bars, levers secured to said bars, a lever secured to said floating frame, means to lock said lever in definite relation, and connections between said levers on said bars and said pivoted lever, whereby the inclination of the cultivator teeth may be regulated by tilting said cultivator teeth bars.

4. A wheeled cultivator, comprising a plurality of wheels adapted to support an axle, a tongue pivotally secured to said axle, a floating frame inclosing said tongue and said wheels pivotally secured to said axle, means to guide said tongue in relation to said frame, means to raise and lower said floating frame, a plurality of stirrups secured to the dependent portion of said frame, transversely disposed cultivator teeth bars tiltingly mounted in said stirrups, means to adjust the relation of said bars in said stirrups, cultivator teeth secured to said cultivator teeth bars, means to tilt said bars secured to the said floating frame, and means secured to said bars externally of said floating frame to protect the limbs of trees under which it is desired to operate said cultivator.

In witness that I claim the foregoing I have hereunto subscribed my name this 15th day of August, 1913.

ANDREW J. BARNHART.

Witnesses:
EDMUND A. STRAUSE,
MARIE BATTEY.